US007991138B2

(12) United States Patent
Vaughn (10) Patent No.: US 7,991,138 B2
(45) Date of Patent: Aug. 2, 2011

(54) SOCIAL ERROR PREVENTION

(75) Inventor: Heather Vaughn, Oakhurst, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1151 days.

(21) Appl. No.: 11/228,170

(22) Filed: Sep. 16, 2005

(65) Prior Publication Data

US 2007/0067436 A1    Mar. 22, 2007

(51) Int. Cl.
*H04M 3/42* (2006.01)
*H04M 74/00* (2006.01)
(52) U.S. Cl. ................... 379/210.02; 455/455
(58) Field of Classification Search .... 379/88.01–88.23, 379/196, 207, 188, 89; 709/205–207; 455/456.1, 455/560
See application file for complete search history.

(56) References Cited

U.S. PATENT DOCUMENTS

| 5,796,948 | A | 8/1998 | Cohen .................. 395/200.36 |
| 5,802,157 | A | 9/1998 | Clarke et al. ................ 379/196 |
| 6,460,074 | B1* | 10/2002 | Fishkin ........................ 709/206 |
| 7,443,283 | B2* | 10/2008 | Schmandt et al. .......... 340/407.1 |
| 2002/0013692 | A1 | 1/2002 | Chandhok et al. |
| 2002/0071537 | A1* | 6/2002 | Gainsboro .................. 379/188 |
| 2002/0165012 | A1* | 11/2002 | Kirbas et al. ................. 455/565 |
| 2004/0161086 | A1 | 8/2004 | Buntin et al. ................. 379/189 |
| 2004/0166878 | A1* | 8/2004 | Erskine et al. ............. 455/456.1 |
| 2005/0153680 | A1* | 7/2005 | Yoshioka et al. .......... 455/404.1 |
| 2006/0099974 | A1* | 5/2006 | Contractor .................. 455/461 |
| 2006/0244461 | A1* | 11/2006 | Song et al. .................. 324/500 |

FOREIGN PATENT DOCUMENTS

| WO | WO02/06997 | 1/2002 |
| WO | WO 02/06997 A2 | 1/2002 |

* cited by examiner

*Primary Examiner* — Fan Tsang
*Assistant Examiner* — Solomon Bezuayehu
(74) *Attorney, Agent, or Firm* — Brosemer, Kolefas & Assoc. LLC (57) ABSTRACT

Inappropriate messages can be eliminated by an automatic etiquette agent which, based on prescribed etiquette rules, initially prevents a communication from being established unless it receives a further authorization from the user. The etiquette rules represent prescribed social characteristics and situations and they may be set by, or customized by the user, an organization to which the user belongs, or a communication service provider. The automatic etiquette agent may question the user on the advisability of establishing a communication, e.g., by presenting a dialog box or voice prompt to the user and receiving a simple affirmation if communication is to be established. Alternatively, the user may be prompted by the automatic etiquette agent to enter a password that clearly indicates the user's assent. In the event that the automatic etiquette agent does not receive the appropriate affirmation of the user's intent, the communication is not established.

28 Claims, 3 Drawing Sheets

FIG. 3

SOCIAL ERROR PREVENTION

TECHNICAL FIELD

This invention relates to person-to-person communication, and more particularly, to eliminating unwanted communications.

BACKGROUND OF THE INVENTION

It is well known that users communicating, e.g., via voice communications such as telephones, or other electronic communication, such as electronic mail, often initiate communications that they later regret. For example, an individual angry at a decision made by her boss decides to call the boss and leaves an irate and inappropriate message, which employs terms that are far beyond what is conventionally socially and professionally acceptable. Later, when the individual calms down, she realizes the inappropriateness of the message and wishes she had never sent it, but it is too late to retract the message. As another example, a person composes a message for a friend that contains a lewd image but accidentally sends the message to the president of the company for which he works, whose name is similar to that of the intended friend. Such an occurrence is more likely if the sender had consumed alcohol, e.g., at a party. A further example is when a first person makes a call for a routine matter to a second person, e.g., their best client, who is in a time zone where the call would be received in the middle of the night, thus awakening and angering the client.

SUMMARY OF THE INVENTION

I have recognized that the problem of inappropriate messages can be eliminated by an automatic etiquette agent that initially prevents a communication from being established, e.g., a composed message is prevented from being transmitted to the intended recipient or an initiated call is prevented from being completed to the intended called party, when a violation of at least one prescribed etiquette rule is detected by the automatic etiquette agent unless it receives a further authorization from the user to actually establish the communication notwithstanding the violation of the at least one prescribed etiquette rule. The etiquette rules represent prescribed social characteristics and situations and they may be set by, or customized, by a) the user, b) an organization to which the user belongs, or c) a communication service provider, or any combination thereof.

For example, the automatic etiquette agent may question the user, e.g., by presenting a dialog box or voice prompt, on the advisability of sending a message or initiating a call that violates an etiquette rule and only upon detecting a simple affirmation, such as a mouse click over a prescribed region or single button press on a telephone set, that the communication is indeed to actually be established notwithstanding the etiquette rule violation is the communication established. Alternatively, the user may be prompted by the automatic etiquette agent to enter a password in order to clearly indicate her assent to establish the communication notwithstanding the etiquette rule violation. In the event that the automatic etiquette agent does not receive the appropriate affirmation of the user's intent that the communication is indeed to actually be established, the communication is not established, e.g., the composed message is not transmitted to the intended recipient or a call to the intended called party is not completed.

The automatic etiquette agent may be implemented in the device the user is using to initiate the proposed communication, in a network to which the device the user is using is, or may be connected, or any combination thereof.

In one exemplary embodiment of the invention, the user, prior to attending a party at which alcohol is served, sets what may be thought of as a "party manager" rule, which generally, is violated when a communications is being made to any people in a defined group of work-related individuals. The rule may be such as to be considered violated only for a prescribed amount of time, e.g., 6 hours. Alternatively, the rule may be such as to be considered violated based on the location of the user, e.g., after it is detected that the user left the location of the party the party manager rule is such that it is no longer considered violated. Further alternatively, the rule may considered violated for a duration that is based on a combination of time and location information, e.g., the rule is set to no longer apply 6 hours after the user leaves the location of the party. Advantageously, such a rule may help to prevent any inappropriate calls that may be made during and after the party.

DETAILED DESCRIPTION

The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function. This may include, for example, a) a combination of electrical or mechanical elements which performs that function or b) software in any form, including, therefore, firmware, microcode or the like, combined with appropriate circuitry for executing that software to perform the function, as well as mechanical elements coupled to software controlled circuitry, if any. The invention as defined by such claims resides in the fact that the functionalities provided by the various recited means are combined and brought together in the manner which the claims call for. Applicant thus regards any means which can provide those functionalities as equivalent as those shown herein.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

In the description, identically numbered components within different ones of the FIGs. refer to the same components.

As used herein, the term "label" generally refers to information displayed on a page by a software program that cannot be changed or selected by the user on that page, although it may be changed by making a selection elsewhere, e.g., on a different page. The term "field" generally refers to an area into which a user may enter information or make a selection of information that is presented to the user.

Figure 1:
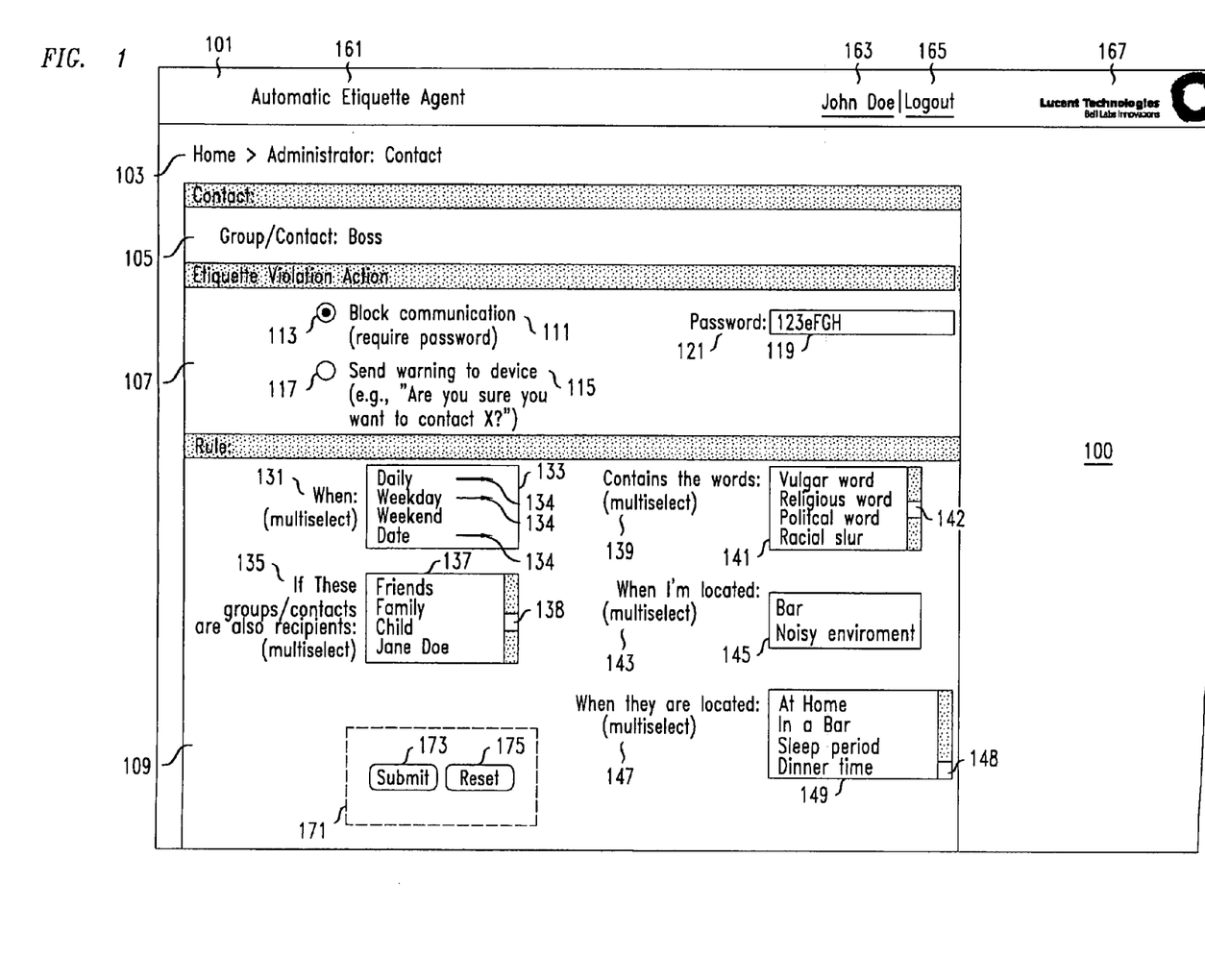
FIG. 1 shows an exemplary page that can be used by a user to set prescribed etiquette rules, in accordance with the principles of the invention.

FIG. 1 shows exemplary page 100, e.g., a worldwide web type page in hypertext markup language, displayable, e.g., using a so-called "browser" on an electronic screen, e.g., on the display of a personal computer, that can be used by a user to set prescribed etiquette rules that can later be used to prevent a communication from being established until a further authorization is received from the user, in accordance with the principles of the invention. The page may displayed as part of 1) a contacts list manager, 2) special software provided by a service provider, or 3) other software. As shown, page 100 has a) header section 101, b) navigation location indication 103, c) contact area 105, d) etiquette violation action area 107, and e) rules area 109. Also shown in FIG. 1 is that page 100 has user acceptance area 171.

Header section 101 displays to the user certain basic information identifying the overall page that that the user has reached. Thus, header section 101 displays in label 161 that page 100 is part of the "Automatic Etiquette Agent". Label 163 indicates the user name of the particular account that is active, which typically should be the user's account name. Logout hypertext link 165 is a link to bring the user to a logout screen so that the user may logout, e.g., for security reasons or to enable management of a different user account, possibly by a different user sharing the device displaying page 100. Such logout hypertext links are conventional and are known by those of ordinary skill in the art. Field 167 indicates the provider of the software, e.g., Lucent Technologies, or the provider of the automatic etiquette agent service.

Navigation location indication 103 informs the user as to where in the software the user is currently working. In the example shown in FIG. 1, the user is working in the contact area in the administration part of the software. Similarly, contact area 105 informs the user the identity of the individual contact, or group of contacts, the etiquette rules for which are currently being viewed by the user. As shown in FIG. 1, the current contact for whom the rules are currently being viewed by the user is "Boss".

Etiquette violation action area 107 provides a way for a user to specify the type of action that needs to be taken in the event an etiquette rule for the current contact shown in contact area 105 is violated. To this end, label "block communication (require password)" 111 offers the user the option of blocking a communication from being completed in the event the communication violates one of the etiquette rules. The user selects this option through the use of field 113, which is a conventional software radio button. If the user "clicks" on field 113, e.g., using a pointing device, such as a mouse or a stylus, e.g., for a personal digital assistant (PDA) or tablet personal computer (PC), the radio checkbox of field 113 becomes highlighted, e.g., filled, as shown in FIG. 1. The user enters into field 121 the password that will be required of the user in the event of an attempt to establish a communication that violates an etiquette rule.

The password may be remembered for all other contacts or groups, and when changed by the user for any one contact or group is changed for all the others. Alternatively, those of ordinary skill in the art will readily recognize that the user may require distinct passwords for one or more individual contacts. It may be desirable to have the ability to have distinct passwords for different contacts so as to mitigate the likelihood of habitual, but mistaken, entry of the correct password in the face of an etiquette rule violation.

In the event that a user does not want to require entry of a password in the face of an etiquette rule violation, but instead merely wants a simple affirmation of the desire to establish the communication to be demanded, the user selects field 117, which is next to corresponding label 115, e.g., by clicking on the displayed radio button.

In rules area 109 the particular rules that apply to the contact or group specified in contact area 105 is defined. A rule is defined by selecting a set of rule parameters in the various fields of rules area 109. Rules area 109 contains several fields, each associated with a label, which provides to the user the context in which the parameter that can be selected should be understood. Thus, label 131 indicates that the user has a choice of when a rule should apply that may be selected from the choices of field 133. Furthermore, label 131 indicates that multiple ones of the available choices may be selected from field 133.

Field 133 is a box with several choices, indicating daily, weekday, weekend, and date. Daily indicates that the rule should apply every day. Weekday indicates that the rule should apply only on weekdays, e.g., Monday through Friday in the United States. Implementations in other countries or at particular locations, may have a different definition of weekdays, e.g., in Israel it might be defined as Sunday through Thursday. The etiquette agent may determine whether any particular day is considered a weekday. This may be done, for example, based on the a) supplied definitions, b) location of the user, and c) on the location of the intended communication recipient, when they are known by the etiquette agent. Additionally, the etiquette agent may determine that holidays are not to be considered weekdays. Again, what is a holiday may be defined in a country or location dependent manner. Similarly, weekends indicate that the rule should apply only on weekend days, e.g., Saturday and Sunday in the United States. Again, this may be defined in a country or location dependent manner and may be determined based on available location information. Depending on which field is selected by the user, a further field, not shown but indicated by one of arrows 134, may pop up to allow the user to specify a particular range of times.

Lastly, date allows for the user to select a particular one or more dates for the rule to apply. For date, a further field, not shown, but indicated by arrow 134, will pop up to allow the user to specify a particular range of dates. The further field may be manifest as a calendar. Using such a calendar it is also possible that the user can set particular time ranges on the particular dates.

Note that a user need not select any particular date or time.

Those of ordinary skill in the art may choose to provide additional choices. If so, field 133 may need to be larger or have a scroll box to allow the user to access all the possible choices. For example, the user may be able to set a time period relative to the occurrence of an event, e.g., 6 hours after detection that the user has exited a bar. In other embodiments of the invention, only a subset of the choices indicated hereinabove may be provided. Furthermore, the implementer may provide only some of the choices indicated hereinabove as well as other choices of her choosing.

Label 135 indicates that the user may choose one or more other recipients to whom a communication may be addressed but for which it is unlikely that such other recipient(s) would receive the same communication as the contact indicated in contact area 105. For example, although it is possible, it is unlikely that it is appropriate for the same communication, e.g., email, to be sent to one's boss and one's family. Thus, setting this rule helps prevent inadvertently sending to one's boss a communication that is personal in nature and not intended for the boss.

Field 137 displays a list of particular potential addressees. For example, the user may choose from the displayed choices of friends; family; child; an individual—shown as Jane Doe—; and others, not shown but implied by scroll box 138, e.g., church member, lodge member, school board; and the like. Furthermore, label 135 indicates that multiple ones of the available choices may be selected from field 137. Note that the current contact or group indicated by contact area 105 will not appear in field 137. However, that particular contact or group may appear in field 137 when a different contact or group appears in contact area 105. Thus, for example, the contact Boss may appear when Jane Doe is the contact appearing in contact area 105.

The user may define the individuals that are in a particular group, such as friends or family. This may be done on another screen, not shown, or using other conventional administering tools. For example, a contact list manager may provide for the entry of a type identifier when entering each contact, and each entry with the same type identifier may be considered to be part of a group. Also, a user may specify that particular persons be listed as individual contacts in field 137.

Note that a user need not select any particular group or contact.

Label 139 indicates that the user has a choice of types of words that it is unlikely would be appropriate to use in a communication with the contact indicated in contact area 105. For example, although it is possible, it is unlikely that it is appropriate to use vulgar words in a communication, e.g., an email, to be sent to one's boss. Thus, setting this rule helps prevent inadvertently sending to one's boss a communication that contains inappropriate content.

Field 141 displays a list of the particular types of words to searched for in the communication. For example, the user may choose from the displayed choices of vulgar words, religious words, political words, and racial slurs. There may be other such word type categories that are not shown but are implied by scroll box 142, e.g., angry words, defamatory, and name-calling words, etc. It is also possible to define a category of exception words for the contact displayed in contact field 105. Such a category would include words that are listed in at least one of the types displayed in field 141, and so would otherwise trigger the etiquette violation action specified in etiquette violation action area 107, but will not do so for the contact displayed in contact field 105. Furthermore, label 139 indicates that multiple ones of the available choices may be selected from field 141.

The user may define the particular words that are in each particular type. This may be done on another screen, not shown, or using other conventional administering tools. Alternatively, the supplier of the software or service may define in advance a standard basic list of words for each type. If so, the user may be allowed to specify additional words for each list, to define new lists, or to delete one or more of the listed words.

Note that a user need not select any particular type of word.

Label 143 indicates that the user has a choice of particular situations in which the user is found and in which it is likely to be inadvisable or inappropriate to establish a communication with the contact indicated in contact area 105. For example, although it is possible, it is unlikely that one should originate a communication, e.g., a telephone call, to one's boss from a bar, e.g., due to the possible intoxicating effects of alcoholic beverages consumed thereat. Thus, setting this rule helps prevent inadvertently sending to one's boss a communication that contains inappropriate content, even without employing inappropriate words. Alternatively, it may be inadvisable to originate business calls, or any calls, such as may be related to a sensitive matter, from a noisy environment. Although not shown, the user may be able to enter a particular location, e.g., by address or name of a business. Such an address may correspond to the location at which a party is being held. Furthermore, it may be possible to set for each such location a corresponding time period for the rule. For example, the rule relating to a bar could continue in effect until 6 hours after the user has left the location of the bar.

Field 145 displays a list of the particular types of situations or locations in which a communication originator might be found. For example, the user may choose from the displayed choices of bar and noisy environment. There may be other such situations or locations that less common. For example, it is likely to be inappropriate to make a call from a location the contact displayed in contact field 105 has prohibited one from going to. Alternatively, it may be inappropriate to originate a video call to the contact displayed in contact field 105 from a sauna or other place where one would be inappropriately attired. Communications, e.g., calls, which are detected as originating from one of the selected locations listed in field 145 would trigger the etiquette violation action specified in etiquette violation action area 107. The nature of a location may be known based on comparing its geographic coordinates, e.g., based on conventional location technology such as those that employ global positioning system (GPS) measurements, with a list of establishment types known to be at that location. Alternatively, the geographic coordinates may be determined based on the signal strengths of wireless signals between a mobile device and antennas with which they communicate. The nature of an environment, e.g., the noise level, may be determined based on measurements made through the microphone of the communications device. Furthermore, label 143 indicates that multiple ones of the available choices may be selected from field 145.

Note that a user need not select any particular location.

Label 147 indicates that the user may choose particular situations in which the contact indicated in contact area 105 is to be found and as a result it is likely to be inadvisable or inappropriate to establish a communication with the contact indicated in contact area 105. For example, although it is possible, it is unlikely that one should originate a communication, e.g., a telephone call, to one's boss during the time they are supposed to be sleeping. As another example, although it is possible, it is unlikely that one should originate a communication, e.g., a telephone call, to one's boss when the boss is in a bar, e.g., due to the possible intoxicating effects of alcoholic beverages consumed thereat. Thus, setting this rule helps prevent inadvertently sending a communication that is likely to annoy the recipient or to which the recipient may be not be suited to respond responsibly.

Field 149 displays a list of the particular types of situations or locations in which a communication recipient might be found. For example, the user may choose from the displayed choices of at home; in a bar; in a sleep period; or at dinner time, as well as from others that are not shown but are implied by scroll box 148, e.g., theater, movie, church service, family hour, vacation, pre-work hours, at a doctor, in the hospital, in a particular room at one of the above-mentioned locations, and so forth. Furthermore, label 147 indicates that multiple ones of the available choices may be selected from field 149.

Communications, e.g., calls, which are detected as going to be completed at one of the selected locations listed in field 149 or under one of the conditions selected in field 149 would trigger the etiquette violation action specified in etiquette violation action area 107. As previously indicated, the nature of a location may be known based on comparing its geographic coordinates, e.g., based on global positioning system (GPS) measurements, with a list of establishment types known to be at that location. The actual current time at any location, i.e., after taking into account the local time zone, can be determined by a communications network, and that is time that should be employed.

The user may define certain parameters for various ones of the choices offered by field 149. This may be done on another screen, not shown, or using other conventional administering tools. Alternatively, the supplier of the software or service may define in advance a standard basic set of parameters for each choice. For example, dinner time may be initially defined in the standard basic set as being between 6 and 8 P.M., but the user may change that, based on information available to her, to be between 7:30 and 9:00 P.M. Furthermore, such information may be customizable on a per-contact basis. Moreover, the information employed may be imported from a profile that was established by the contact himself, should such a profile be established. The user may be allowed to specify additional categories or to delete one or more of the already existing choices.

Note that a user need not select any particular choice from field 149.

User acceptance area 171 includes submit button 173 and reset button 175. When a user selects submit button 173, her choices are recorded so that they may be implemented as the user's currently set rules. Should a user be dissatisfied with the current state of the rules as they have changed them on page 100 but not yet stored those changes by selecting submit button 173; the user may select reset button 175, which will restore the displayed choices to the currently stored state of the rules.

Those of ordinary skill in the art will readily recognize that other types of fields, both well known and newly developed, may be used to obtain the information from the user, e.g., drop down boxes, check boxes, text boxes, and the like.

Figure 2:
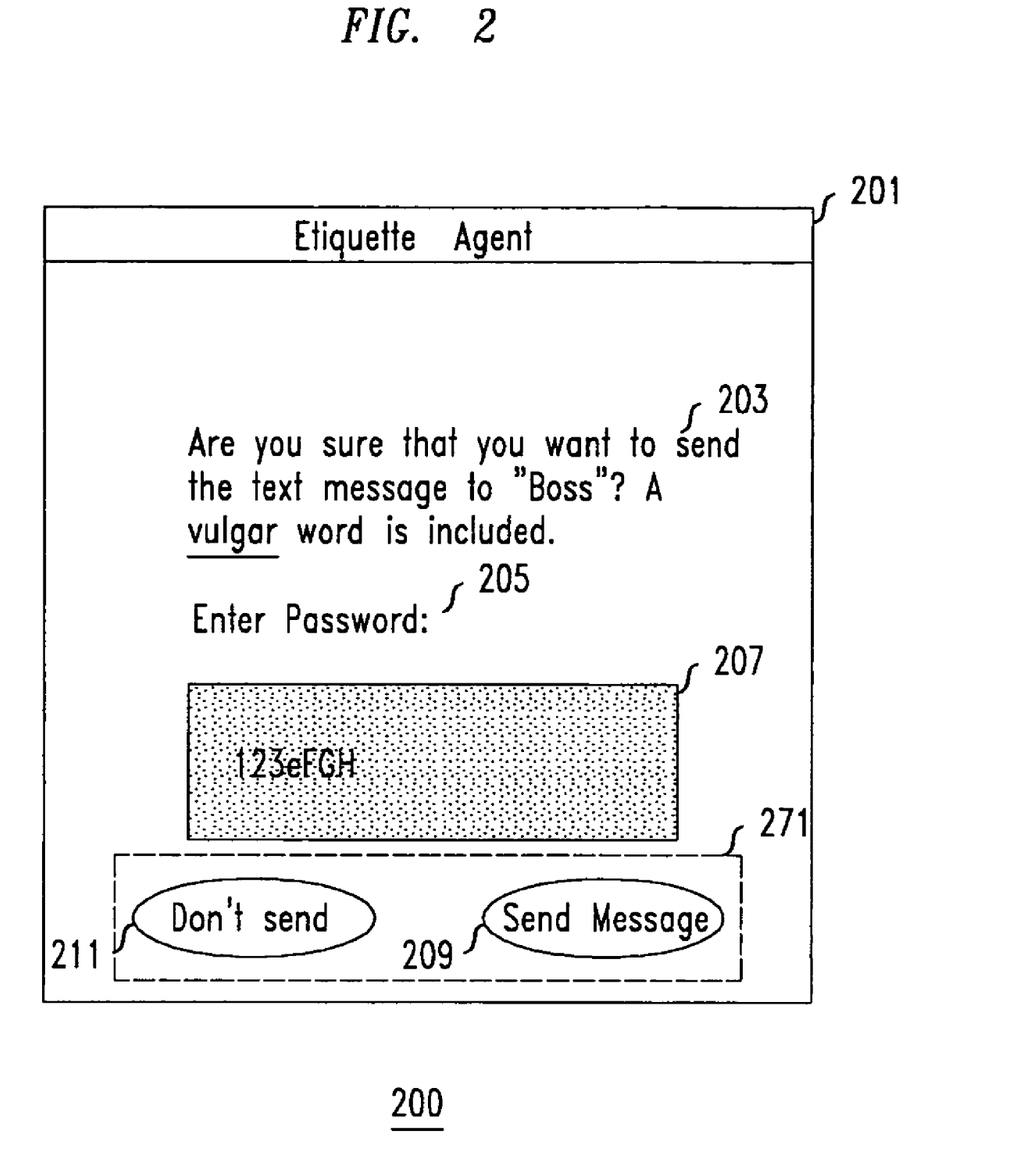
FIG. 2 shows an exemplary dialogue box questioning the user on the advisability of sending a message, in accordance with the principles of the invention.

FIG. 2 shows exemplary dialogue box 200 that would appear, in accordance with the principles of the invention, when a user attempts to initiate a message to her boss, but has included what is recognized by the automatic etiquette agent as a vulgar word, and the automatic etiquette agent has a rule set so as to question the user on the advisability of sending to the boss a message with a vulgar word in it, e.g., using exemplary page 100 (FIG. 1). Exemplary dialog box 200 (FIG. 2) includes a) header section 201, b) message section 203, c) optional password prompt 205, d) optional input field area 207, and e) user acceptance area 271.

Header section 201 displays to the user information identifying the dialog box that that the user has reached. Thus, header section 201 displays "Etiquette Agent", indicating that the dialog box is part of the "Automatic Etiquette Agent" and not necessarily a part of the application that the user employed to compose the text message that is under scrutiny.

Message section 203 provides an indication to the user of the particular etiquette rule that has been violated. In the particular case of dialog box 200, the violation is that of including a vulgar word in an email that has as at least one of the intended recipients the user's boss. Therefore, message section 203 states "Are you sure that you want to send the text message to "Boss"? Alternatively, the particular word that triggered the etiquette rule violation may be listed.

Optional password prompt 205 prompts the user to enter a password, should the user have administered the automatic etiquette agent to require a password prior to establishing a communication that violates one of the programmed etiquette rules. Optional input field area 207 is an area that may display the password information entered by the user. Note that the actual password as entered by the user may not be displayed. Instead, only a single prescribed character, e.g., "*", may be repeated once for each character entered by the user, in the conventional manner. In this way the user knows the number of characters entered, but the actual characters are not visible to unauthorized onlookers.

User acceptance area 271 includes send message button 209 and don't send message button 211. When a user selects send message button 209, should the option of requiring a password not be enabled, and hence optional password prompt 205 and optional input field 207 not be displayed, the message is sent. When the option of requiring a password is enabled, and hence optional password prompt 205 and optional input field 207 are displayed, the message is sent only when the user supplies the correct password prior to selecting send message button 209. Otherwise, dialogue box 200 is merely redisplayed. Note that any characters entered into optional input field area 207 may be remembered and redisplayed, or not, at the implementer's discretion.

When a user selects don't send button 209 the user may be returned to the editor that was used to create the message, e.g., so that the vulgar word may be deleted.

Similarly, for initiating contacts with a device that does not have a display, but only audio communication capabilities, e.g., a telephone, when one of the rules is violated an audio warning may be given to the user, e.g., "Do you really want to call your boss, since it appears to be his sleep period presently". The user can then be prompted to provide an indication that the call should proceed, e.g., by stating to the user "If you wish to continue anyway, please press the # key. If not, please press the * key". If the user presses the # key on the telephone within a prescribed amount of time the call is allowed to proceed. If the user presses the * key, or the predetermined amount of time elapses, the call request is canceled. Those of ordinary skill in the art will readily recognize that the user may speak her response and voice recognition may be employed to determine what that response is.

Should the user have administered the automatic etiquette agent to require a password prior to initiating a communication that violates one of the programmed etiquette rules, the user may be alternatively prompted to supply a password by typing the keys on the keypad of the telephone that correspond to the password. In the event the correct password is entered, within a prescribed amount of time the call is allowed to proceed. If the wrong password is entered, or the predetermined amount of time elapses, the call request is canceled. Note that for audio only applications, the password may be considered to be case insensitive.

Figure 3:
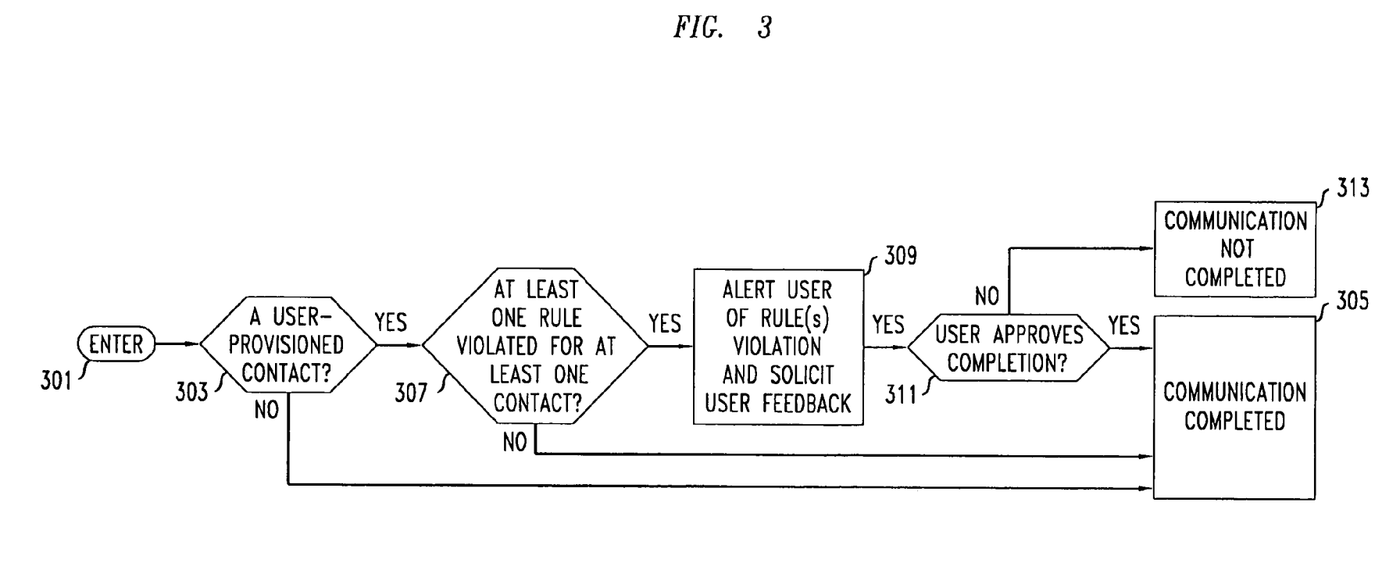
FIG. 3 shows an exemplary flow chart by which the automatic etiquette agent questions the user on the advisability of establishing a communication, in accordance with the principles of the invention.

FIG. 3 shows an exemplary flow chart of a process by which the automatic etiquette agent prevents the establishment of a communication that violates a set etiquette rule until it receives appropriate user affirmation to establish the communication notwithstanding the rule violation, in accordance with the principles of the invention. More specifically, in accordance with the process of FIG. 3, the automatic etiquette agent questions the user on the advisability of establishing a communication, such as sending or completing a communication, e.g., sending a composed text message or initiating a telephone call, when an etiquette rule for a contact with whom the communication is to occur is violated, and the communication is only completed upon receiving appropriate user affirmation to do so anyway. The process is entered in step 301 when a user attempts to establish a communication, e.g., by sending a composed email or dialing a telephone call, which invokes the automatic etiquette agent. Control passes to conditional branch point 303, which tests to determine if at least one person to whom the communication is destined is a contact for whom etiquette rules have been provisioned, e.g., through the use of exemplary page 100 (FIG. 1). If the test result in step 303 is NO, indicating that there are no individuals to whom the communication is destined and for whom etiquette rules have been provisioned and so there is no reason that the communication cannot be established, control passes to step 305 and the communication is completed.

By completed it is intended the appropriate further processing of the communication. What this entails depends, as will be readily recognized by those of ordinary skill in the art, on the particular type of communication and the location within the overall communication system of the automatic etiquette agent. For example, when the automatic etiquette agent is resident in the local device originating the communication, if the communication is an already composed and addressed text or email message, such message is processed to complete its delivery in the conventional manner. Alternatively, if the communication is a telephone call that has been dialed but not connected, because the digits have not been supplied external to the telephone originating the call, then completing the communication may be allowing the digits to be dialed in the conventional manner. However, if the automatic etiquette agent is resident external to the local device originating the communication, e.g., it is in the network that carries the communications, which may be achieved by having the automatic etiquette agent resident in an adjunct node to which a user's communication requests are routed before being completed, completed for a text message that was received by the automatic etiquette agent means allowing the text message to continue to be processed by the network for delivery to its addressees. Similarly, if the communication is a telephone call, completing the communication may be continuing to route the call through the network and on to its ultimate destination, e.g., using signaling system 7 (SS7) messages.

If the test result in step 303 is YES, indicating that there is at least one individual to whom the communication is destined and for whom etiquette rules have been provisioned and so the communication must be checked to determine that no provisioned etiquette rule for such at least one individual is violated, control passes to conditional branch point 307. Conditional branch point 307 tests to determine whether any rule provisioned for each user for whom etiquette rules have been provisioned is violated by the communication. If the test result in step 307 is NO, indicating that no etiquette rules are violated for any individual to whom the communication is destined, so that there is no reason not to complete the call as it accords with all etiquette rules, control passes to step 305 and the communication is completed. If the test result in step 307 is YES, indicating that at least one etiquette rule has been violated for at least one individual to whom the communication is destined, and therefore further user approval is required to actually establish the communication, control passes to step 309, in which the user is alerted to which particular rules are violated by the communication and user assent to complete the communication is sought. For example, dialog box 200 (FIG. 2) may be displayed to the user when the communication is a text message for the user's boss and the text message contains a vulgar word, and there is a rule provisioned that this should not be allowed.

Thereafter, control passes to conditional branch point 311, which tests to determine if the user approves the sending of the communication, notwithstanding the identified at least one violation of the etiquette rules. As indicated hereinabove, the user might approve the sending of the communication by selecting a displayed button or pressing a button on a telephone keypad. Furthermore, if required, e.g., by having been specified by the user, a correct password may be required to be supplied by the user. If the test result in step 311 is YES, indicating that the user approved the completion of the communication in accordance with the user specified requirements, control passes to step 305, and the communication is completed.

If the test result in step 311 is NO, indicating that the user did not approve the completion of the communication, control passes to step 313 in which the communication is not completed, and so the communication is not established. By not completed it is intended the appropriate further processing of the communication will not take place. Instead, the communication will be blocked or returned to the user for further processing. What this entails depends, as will be readily recognized by those of ordinary skill in the art, on the particular type of communication and the location within the overall communication system of the automatic etiquette agent. For example, when the automatic etiquette agent is resident in the local device originating the communication, if the communication is an already composed and addressed text or email message, the user may be returned to the text message editing program. Alternatively, if the communication is a telephone call that has been dialed but not connected, the digits are not supplied external to the telephone originating the call, and the user may be returned to a point at which she can edit the dialed digits. However, if the automatic etiquette agent is resident external to the local device originating the communication, e.g., it is in the network that carries the communications, which may be achieved by having the automatic etiquette agent resident in an adjunct node to which a user's communication requests are routed, a text message that was received by the automatic etiquette agent may be transmitted back to the user and marked as returned to sender. Similarly, if the communication is a telephone call, a tone may be supplied to the user that specifically indicates that the call was not completed due to an etiquette rule violation, or a voice announcement to that effect may be supplied to the user.

Another way to arrange the etiquette rules would be to define a set of rules, and then administer to which contacts each rule applies, where it is possible that both a) multiple rules apply to a particular contact or b) a single rule applies to multiple contacts. Of course, those of ordinary skill in the art will readily recognize the various ways in which etiquette rules may be arranged and will know how to choose one suitable to their particular application.

Note that determining if a user is actually inebriated, to effectuate rules based on actual inebriation, may be achieved by detecting variation of keystroke or speech patterns from stored patterns known to correspond to a noninebrieated condition. Alternatively, a chemical sensor may be employed.

What is claimed is:

1. A method for controlling the ability to establish a communication, by a user originating said communication using a telecommunications equipment, the method comprising the step of:
   in response to (i) origination of said communication and (ii) automatic detection of a violation by said communication of an etiquette rule that is prestored in a computer readable medium, preventing said communication from being completed at least until receipt of an indication of further authorization of said user to establish said communication notwithstanding said violation,
   wherein for a data communication said prestored etiquette rule is determined to be violated as a function of a content of said communication, and wherein for a voice communication said prestored etiquette rule is determined to be violated as a function of a location of at least one party other than said user, and as a function of a characteristic of the environment at a location from which said user originated said communication.

2. The invention as defined in claim 1 wherein said indication of said further authorization of said user is receipt of a correct password.

3. The invention as defined in claim 1 wherein said indication of said further authorization of said user is an indication of a prescribed affirmation act performed in response to a dialog box.

4. The invention as defined in claim 1 wherein said indication of said further authorization of said user is an indication of a prescribed affirmation act in response to a voice prompt.

5. The invention as defined in claim 1 wherein said method is performed at least in part by a device of said user that is used to initiate said communication to be established.

6. The invention as defined in claim 1 wherein said method is performed at least in part by a device within a communications network through which said communication must pass to be established.

7. The invention as defined in claim 1 wherein said method is performed at least in part by a communications network associated with said user.

8. The invention as defined in claim 1 wherein said prestored etiquette rule is one of a plurality of prestored etiquette rules stored in a database.

9. The invention as defined in claim 8 wherein said database is stored, at least in part, in a device of said user.

10. The invention as defined in claim 8 wherein said database is administered, at least in part, by said user.

11. The invention as defined in claim 8 wherein said database is administered at least in part, by a provider of a communications network associated with said user.

12. The invention as defined in claim 8 wherein said database is stored, at least in part, in a communications network associated with said user.

13. The invention as defined in claim 8 wherein said database is administered at least in part, by an organization with which said user is affiliated.

14. The invention as defined in claim 1 wherein said prestored etiquette rule is determined to be violated during the occurrence of a prescribed duration.

15. The invention as defined in claim 1 wherein said prestored etiquette rule is determined to be violated as a function of a location of said user.

16. The invention as defined in claim 1 wherein said prestored etiquette rule is determined to be violated as a function of a prescribed time and a location of said user.

17. A method for controlling the ability to establish a communication, by a user originating said communication, the method comprising the steps of:
   setting at least one etiquette rule;
   storing said set at least one etiquette rule in a computer readable medium;
   determining, in response to origination of said communication by said user, if any of said at least one set etiquette rule is violated by said communication, wherein for a data communication said etiquette rule is determined to be violated as a function of a content of said communication, and wherein for a voice communication said prestored etiquette rule is determined to be violated as a function of a location of at least one party other than said user, and as a function of a characteristic of the environment at a location from which said user originated said communication; and
   when it is determined in said determining step that at least one of said at least one etiquette rule is violated, preventing said communication from being established until receipt of an indication of further authorization of said user to establish said communication notwithstanding said violation.

18. The invention as defined in claim 17 wherein said setting step is performed using a page on a display device presenting choices for said at least one said etiquette rule to said user.

19. The invention as defined in claim 18 wherein said choices are parameters of said at least one etiquette rule.

20. The invention as defined in claim 17 wherein said further authorization is a password received from said user.

21. The invention as defined in claim 17 wherein said step of preventing said communication from being established further comprises the step of prompting said user to supply said further authorization.

22. Apparatus for controlling the ability to establish a communication, by a user originating said communication, the apparatus comprising:

means for setting at least one etiquette rule;

means for storing in a computer readable medium said set at least one etiquette rule;

means for determining, in response to origination of said communication, if any of said at least one set etiquette rule is violated by said communication, wherein for a data communication said etiquette rule is determined to be violated as a function of a content of said communication, and wherein for a voice communication said prestored etiquette rule is determined to be violated as a function of a location of at least one party other than said user, and as a function of a characteristic of the environment at a location from which said user originated said communication; and means for preventing said communication from being established at least until receipt of an indication of further authorization of said user to establish said communication notwithstanding said violation when it is determined by said determining means that at least one of said at least one set etiquette rule is violated.

23. Apparatus for controlling the ability to establish a communication, by a user originating said communication, the apparatus comprising:

prompting means for requesting an affirmation from a user initiating a communication that said communication should indeed be established notwithstanding that at least one etiquette rule stored in a computer medium is violated by said communication, wherein for a data communication said etiquette rule is determined to be violated as a function of a content of said communication, and wherein for a voice communication said prestored etiquette rule is determined to be violated as a function of a location of at least one party other than said user, and as a function of a characteristic of the environment at a location from which said user originated said communication; and means for receiving said affirmation from said user.

24. The invention as defined in claim 23 further comprising a display screen for setting said at least one etiquette rule.

25. The invention as defined in claim 23 wherein said means for prompting provides a visual prompt.

26. The invention as defined in claim 23 wherein said means for prompting provides an oral prompt.

27. The invention as defined in claim 23 wherein said means for receiving receives an indication of an oral affirmation supplied by said user.

28. The invention as defined in claim 23 wherein said means for receiving receives an indication of a tactile affirmation supplied by said user.

* * * * *